United States Patent
Lamb et al.

(10) Patent No.: US 8,325,213 B2
(45) Date of Patent: Dec. 4, 2012

(54) VIDEO COMMUNICATION SYSTEM AND METHOD

(75) Inventors: Duncan Lamb, London (GB); Benjamin Dove, London (GB)

(73) Assignee: Skype, Dublin (IE)

( * ) Notice: Subject to any disclaimer, the term of this patent is extended or adjusted under 35 U.S.C. 154(b) by 1375 days.

(21) Appl. No.: 12/006,055

(22) Filed: Dec. 28, 2007

(65) Prior Publication Data

US 2009/0010485 A1 Jan. 8, 2009

(30) Foreign Application Priority Data

Jul. 3, 2007 (GB) .................................. 0712879.6

(51) Int. Cl.
*H04N 7/14* (2006.01)
(52) U.S. Cl. .................................. 348/14.01; 348/14.08
(58) Field of Classification Search .... 348/14.01–14.16; 370/260–271; 379/201.01, 202.01
See application file for complete search history.

(56) References Cited

U.S. PATENT DOCUMENTS

| | | | | |
|---|---|---|---|---|
| 5,764,736 A | * | 6/1998 | Shachar et al. | 379/93.09 |
| 6,139,197 A | | 10/2000 | Banks | |
| 6,151,619 A | * | 11/2000 | Riddle | 709/204 |
| 2002/0109770 A1 | | 8/2002 | Terada | |
| 2003/0025786 A1 | * | 2/2003 | Norsworthy | 348/14.08 |

FOREIGN PATENT DOCUMENTS

| | | |
|---|---|---|
| EP | 0 858 202 A2 | 8/1998 |
| WO | WO 2005/009019 A2 | 1/2005 |

OTHER PUBLICATIONS

Boutell, T. et al., "PNG Specification," pp. 1-102, (Mar. 1997).

* cited by examiner

*Primary Examiner* — Brian Ensey
(74) *Attorney, Agent, or Firm* — Wolfe-SBMC

(57) ABSTRACT

A method of capturing an image from a video call between a first user and a remote user over a communication network. The method includes receiving video data from the remote user at a client executed at a user terminal of the first user, the video data comprising a sequence of frames; the client capturing a frame of the video data responsive to a command from the first user; the client extracting image data from the frame; the client converting the image data to an image file and embedding a communication identity of the remote user in the image file, wherein the communication identity is suitable for initiating a communication event with the remote user; and storing the image file on a storage means of the user terminal.

70 Claims, 14 Drawing Sheets

VIDEO COMMUNICATION SYSTEM AND METHOD

RELATED APPLICATION

This application claims priority under 35 U.S.C. §119 or 365 to Great Britain, Application No. 0712879.6, filed Jul. 3, 2007. The entire teachings of the above application are incorporated herein by reference.

TECHNICAL FIELD

This invention relates to a video communication system and method, particularly but not exclusively for use in a voice over internet protocol communication system.

BACKGROUND

Voice over internet protocol ("VoIP") communication systems allow the user of a device, such as a personal computer, to make calls across a computer network such as the Internet. These systems are beneficial to the user as they are often of significantly lower cost than fixed line or mobile networks. This may particularly be the case for long distance calls. To use VoIP, the user must install and execute client software on their device. The client software provides the VoIP connections as well as other functions such as registration and authentication. Advantageously, in addition to voice communication, the client may also provide video calling and instant messaging ("IM").

One type of VoIP communication system uses a peer-to-peer ("P2P") topology built on proprietary protocols. To access the peer-to-peer system, the user must execute P2P client software provided by a P2P software provider on their PC, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the user's identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

As mentioned, one advantage of VoIP communication systems is the ability to support video calling. With video calling, the callers are able to view video images of the other party in addition to voice information. This obviously enables much more natural communication between the parties, as facial expressions are also communicated, thereby making video calls more comparable to a face-to-face conversation.

Traditional public switched telephone networks generally do not offer video calling functionality to users. High data rate mobile networks, such as $3^{rd}$ generation ("3G") mobile networks may offer video calling, but this generally expensive to the user. VoIP video calling is, by contrast, of very low cost or free to the user.

The visual aspect of a VoIP video call enables it to be utilised to display to remote party something that could otherwise only be described verbally, or would require a photograph to be taken and sent to the other party separately. An example of this is a new baby, who can be shown to relatives (some of which may live a long distance away) using video calling.

Therefore, a video call, which comprises a sequence of frames, may contain images that the called party may wish to keep (e.g. an image of the new baby, from the example above). There is therefore a need for a technique to capture and manage images from a video call stream in an efficient and user-friendly manner.

SUMMARY

According to one aspect of the present invention there is provided a method of capturing an image from a video call between a first user and a remote user over a communication network, comprising: receiving video data from said remote user at a client executed at a user terminal of the first user, said video data comprising a sequence of frames; said client capturing a frame of said video data responsive to a command from said first user; said client extracting image data from said frame; said client converting said image data to an image file and embedding a communication identity of said remote user in said image file, wherein said communication identity is suitable for initiating a communication event with said remote user; and storing the image file on a storage means of said user terminal.

Preferably, the communication identity is a username of the remote user. In one embodiment, the communication event is a voice call. In another embodiment, the communication event is a video call. In another embodiment, the communication event is a file transfer. Preferably, the file transfer is a transfer of said image file. In another embodiment, the communication event is an instant messaging conversation.

Preferably, the command from said first user comprises the actuation by said first user of a control displayed in a user interface of said client. Preferably, the image file is a portable network graphics format image file. Preferably, the step of displaying said video data to said first user in a user interface of said client. Preferably, the step of capturing said frame comprises said client copying said frame from said user interface of said client displayed on said user terminal of said first user.

In one embodiment, said step of capturing said frame comprises: said client transmitting a request message to a corresponding client of said remote user over said communication network, wherein said request message requests said corresponding client to copy said frame from said video data; said client accepting a request to establish a file transfer from said corresponding client; and said client receiving said frame using said file transfer from said corresponding client.

Preferably, the method further comprises the step of embedding the date and time of the image capture in said image file. Preferably, the step of storing the image file comprises storing the image file in a predetermined directory on said storage means of said user terminal. Preferably, the method further comprises the step of said client playing a sound to said first user responsive to capturing the frame of said video data.

In one embodiment, the user terminal of the first user is a personal computer. In another embodiment, the user terminal of the first user is a mobile device.

According to another aspect of the present invention there is provided a computer program product comprising program code means which when executed by a computer implement the steps according to the above defined method of capturing an image from a video call.

According to another aspect of the present invention there is provided a method of initiating a communication event between a first user and a remote user over a communication network, comprising: executing a communication client at a user terminal of the first user; said client opening an image file stored at said user terminal responsive to a command from said first user, said image file comprising image data and an embedded communication identity of said remote user; reading the communication identity from the image file and displaying an image from said image data; and displaying at least one user-operable control in association with said image, wherein, responsive to actuation of said at least one user-operable control by said first user, said client uses said communication identity to initiate a communication event with said remote user over said communication network.

Preferably, the communication identity is a username of the remote user. In one embodiment, the communication event is a voice call. In another embodiment, the communication event is a video call. In another embodiment, the communication event is a file transfer. Preferably, said file transfer is a transfer of said image file. In another embodiment, the communication event is an instant messaging conversation.

Preferably, the method further comprises said client determining a presence state for said remote user using said communication identity, and displaying said presence state in association with said image. Preferably, the method further comprises said client determining a name for said remote user using said communication identity, and displaying said name in association with said image.

Preferably, said image file further comprises the date and time of the creation of said image file, and the method further comprises the step of said client reading the date and time and displaying the data and time in association with said image. Preferably, said image is stored on a storage means of said user terminal, and wherein said step of opening said image file comprises accessing a predetermined directory of said storage means. Preferably, the method further comprises the step of opening at least one other image file stored in said predetermined directory and displaying said at least one other image file as a thumbnail image.

Preferably, said communication network is a voice over internet protocol communication network. Preferably, said voice over internet protocol communication network is a peer-to-peer communication network.

In one embodiment, the user terminal of the first user is a personal computer. In another embodiment, the user terminal of the first user is a mobile device.

According to another aspect of the present invention there is provided a computer program product comprising program code means which when executed by a computer implement the steps according to the above defined method of initiating a communication event.

According to another aspect of the present invention there is provided a user terminal for capturing an image from a video call between a first user and a remote user over a communication network, comprising: processing means arranged to execute a client, wherein said client is configured to receive video data comprising a sequence of frames, capture a frame of said video data responsive to a command from said first user, extract image data from said frame, convert said image data to an image file and embed a communication identity of said remote user in said image file, wherein said communication identity is suitable for initiating a communication event with said remote user; and storage means for storing the image file on said user terminal.

According to another aspect of the present invention there is provided a user terminal for initiating a communication event between a first user and a remote user over a communication network, comprising: display means; storage means; and processing means arranged to execute a client, wherein said client is configured to open an image file stored on said storage means responsive to a command from a first user of the user terminal, said image file comprising image data and an embedded communication identity of a remote user, read the communication identity from the image file, display an image from said image data on said display means, and display at least one user-operable control in association with said image on said display means, wherein, responsive to actuation of said at least one user-operable control by said first user, said client uses said communication identity to initiate a communication event with said remote user over said communication network.

According to another aspect of the present invention there is provided a method of capturing a video clip from a video call between a first user and a remote user over a communication network, comprising: receiving video data from said remote user at a client executed at a user terminal of the first user, said video data comprising a sequence of frames; said client capturing a plurality of said frames of said video data responsive to a command from said first user; said client converting said plurality of said frames to an video file and embedding a communication identity of said remote user in said video file, wherein said communication identity is suitable for initiating a communication event with said remote user; and storing the video file on a storage means of said user terminal.

According to another aspect of the present invention there is provided a method of initiating a communication event between a first user and a remote user over a communication network, comprising: executing a communication client at a user terminal of the first user; said client opening an video file stored at said user terminal responsive to a command from said first user, said video file comprising video data and an embedded communication identity of said remote user; reading the communication identity from the video file and displaying a video from said video data; and displaying at least one user-operable control in association with said video, wherein, responsive to actuation of said at least one user-operable control by said first user, said client uses said communication identity to initiate a communication event with said remote user over said communication network.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
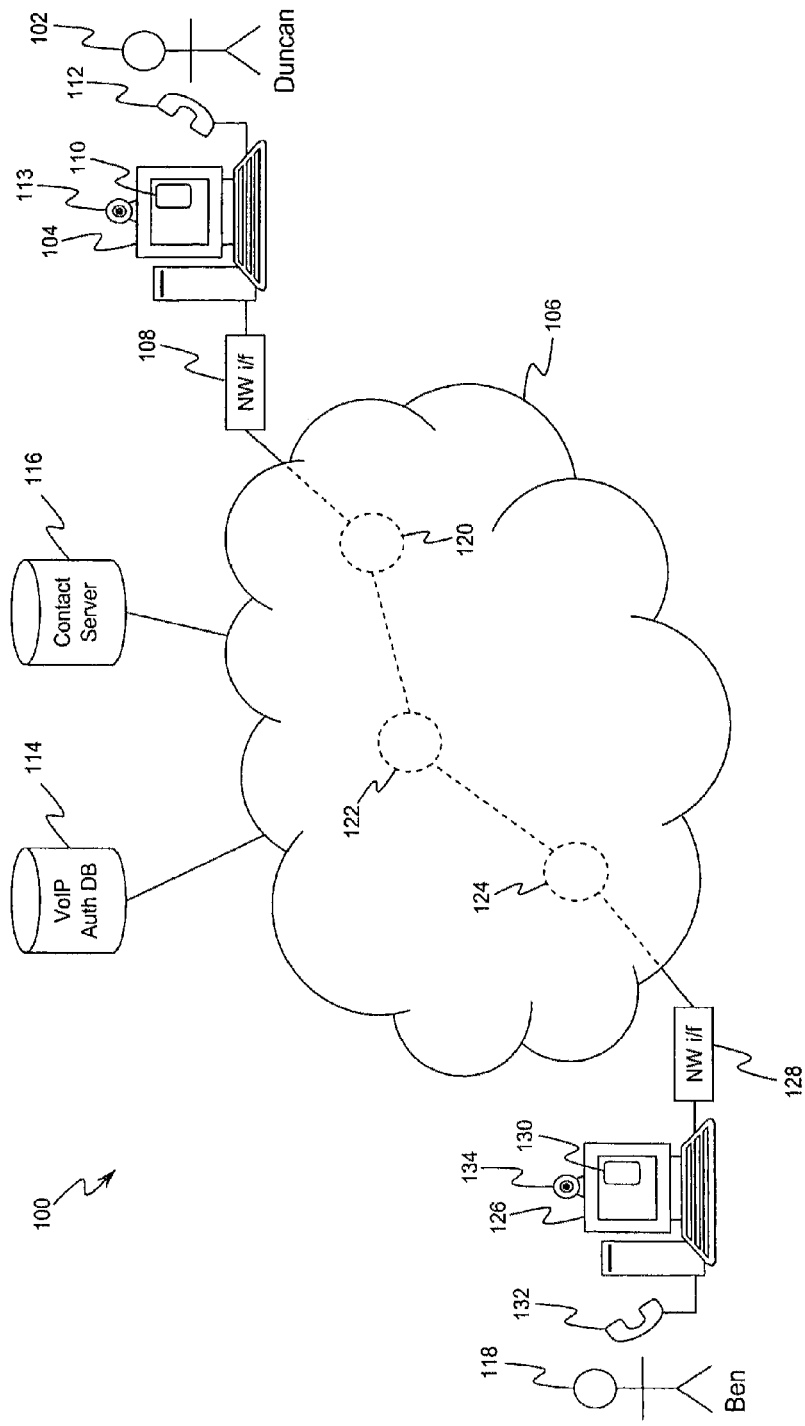
FIG. 1 shows a VoIP communication network.

Reference is first made to FIG. 1, which illustrates a system 100 for enabling the capture and storage of images from a video call over VoIP. In the embodiment shown in FIG. 1, a P2P communication system is illustrated, although it will be understood that other forms of communication could also be used.

A first user of the VoIP communication system (given the example name "Duncan" 102) operates a user terminal 104, which is shown connected to a network 106, such as the Internet. The user terminal 104 may be, for example, a personal computer ("PC"), personal digital assistant ("PDA"), a mobile phone, a gaming device or other embedded device able to connect to the network 106. The user device has a user interface to receive information from and output information to a user of the device. In a preferred embodiment of the invention the user interface of the user device comprises a display such as a screen and a keyboard and mouse. The user terminal 104 is connected to the network 106 via a network interface 108 such as a modem, and the connection between the user terminal 104 and the network interface 108 may be via a cable (wired) connection or a wireless connection.

The user terminal 104 is running a client 110, provided by the VoIP software provider. The client 110 is a software program executed on a local processor in the user terminal 104. The user terminal 104 is also connected to a handset 112, which comprises a speaker and microphone to enable the user to listen and speak in a call. The microphone and speaker does not necessarily have to be in the form of a handset, but can be in the form of a headphone or earphone with an integrated microphone, or as a separate loudspeaker and microphone independently connected to the user terminal 104. The user terminal 104 is also connected to a camera 113, which is used to capture video images of Duncan 102 when engaged in a video call. Preferably, the camera 113 is a webcam.

Figure 2:
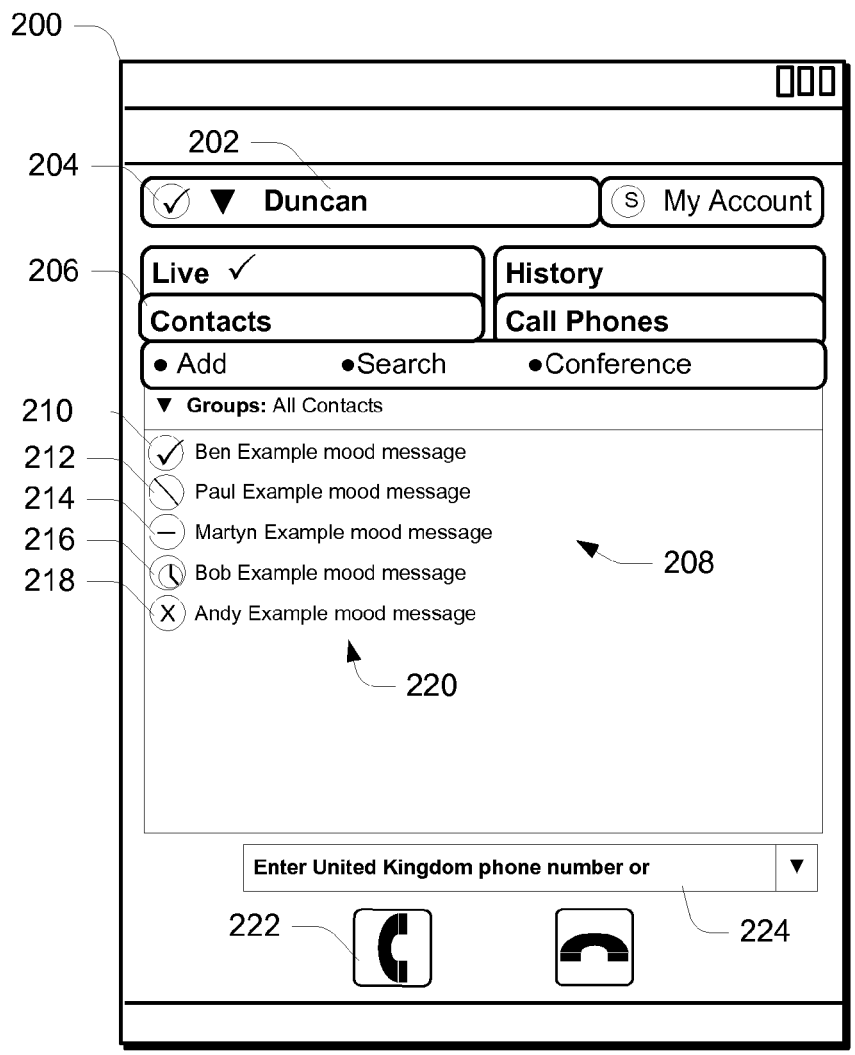
FIG. 2 shows a user interface of a VoIP client.

An example of a user interface 200 of the client 110 executed on the user terminal 104 of Duncan 102 is shown illustrated in FIG. 2. The client user interface 200 displays the username 202 of Duncan 102 in the VoIP system, and Duncan can set his own presence state (that will be seen by other users) using a drop down list by selecting icon 204.

The client user interface 200 comprises a tab 206 labelled "contacts", and when this tab is selected the contacts stored by the user in a contact list are displayed. In the example user interface in FIG. 2, five contacts of other users of the VoIP system are shown listed in contact list 208. Each of these contacts have authorised the user of the client 106 to view their contact details and online presence and mood message information. Each contact in the contact list has a presence status icon associated with it. For example, the presence status icon for a contact called "Ben" 210 indicates that Ben is "online", the presence icon for a contact called "Paul" 212 indicates that Paul is "not available", the presence icon for a contact called "Martyn" 214 indicates that Martyn's state is "do not disturb", the presence icon for a contact called "Bob" 216 indicates Bob is "away", and the presence icon for a contact called "Andy" 218 indicates that Andy is "offline". Further presence indications can also be included. Next to the names of the contacts in contact list 208 are mood messages 220 of the contacts.

Figure 3:
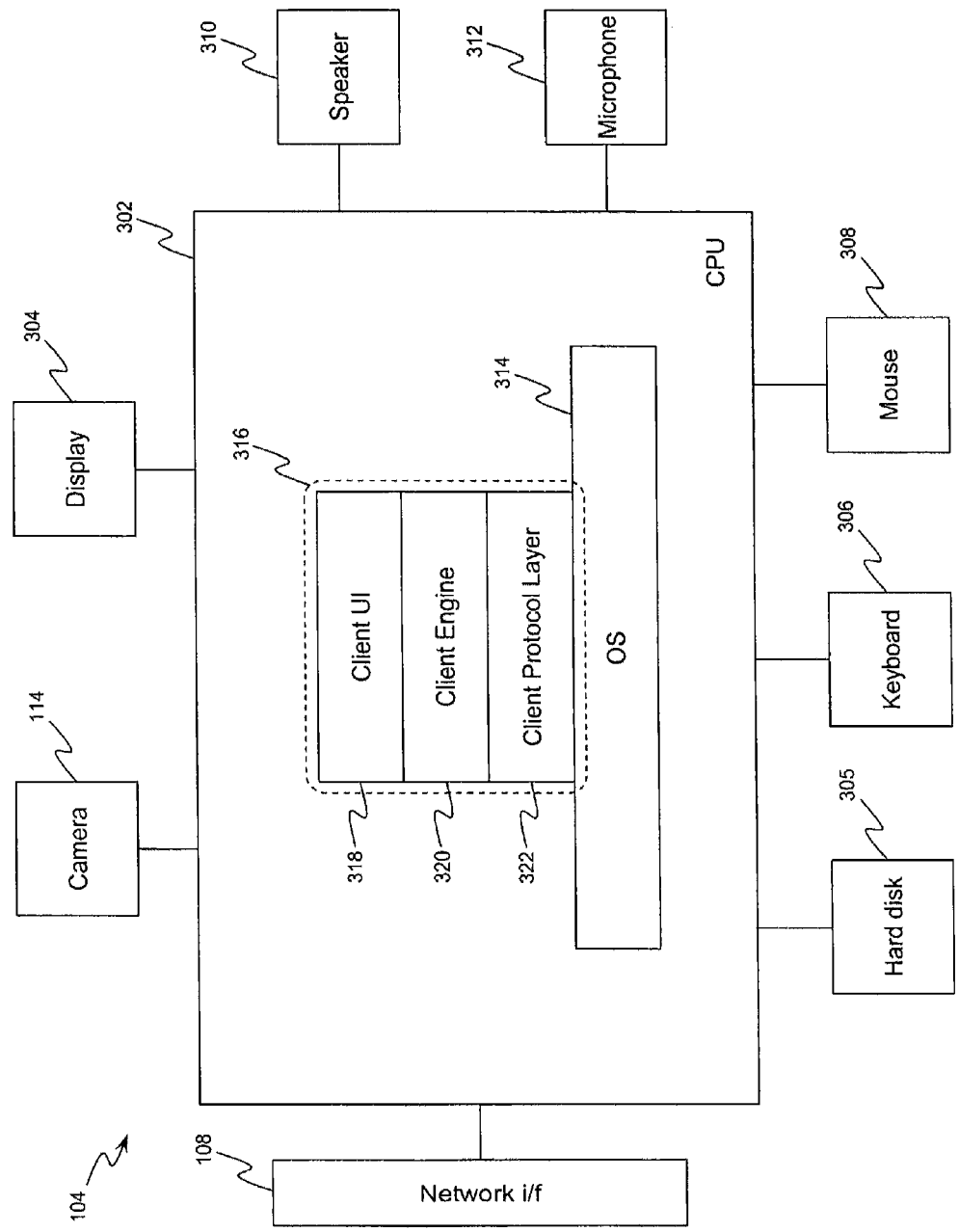
FIG. 3 shows a detailed view of a user terminal on which is executed a client.

FIG. 3 illustrates a detailed view of the user terminal (104) on which is executed client 110. The user terminal 104 comprises a central processing unit ("CPU") 302, to which is connected a display 304 such as a screen, a storage device such as a hard-disk drive 305, an input device such as a keyboard 306, a pointing device such as a mouse 308, a speaker 310 and a microphone 312. The speaker 310 and microphone 312 may be integrated into a handset 112 or headset, or may be separate. The CPU 302 is connected to the camera 113, and is also connected to the network interface 108 as shown in FIG. 1.

FIG. 3 illustrates an operating system ("OS") 314 executed on the CPU 302. Running on top of the OS 314 is a software stack 316 for the client 110. The software stack shows a protocol layer 322, a client engine layer 320 and a client user interface ("UI") layer 318. Each layer is responsible for specific functions. Because each layer usually communicates with two other layers only, they are regarded as being arranged in a stack as shown in FIG. 3. The operating system 314 manages the hardware resources of the computer and handles data being transmitted to and from the network via the network interface 108. The client protocol layer 322 of the client software communicates with the operating system 314 and manages the connections over the VoIP system. Processes requiring higher level processing are passed to the client engine layer 320, which handles the processing required for the user to make and receive calls over the VoIP system. The client engine 320 also communicates with the user client user interface layer 318. The client engine 320 may be arranged to control the client user interface layer 318 to present information to the user via the user interface of the client (as shown in FIG. 2) and to receive information from the user via the user interface. The control of the client user interface 318 will be explained in more detail hereinafter.

Figure 4:
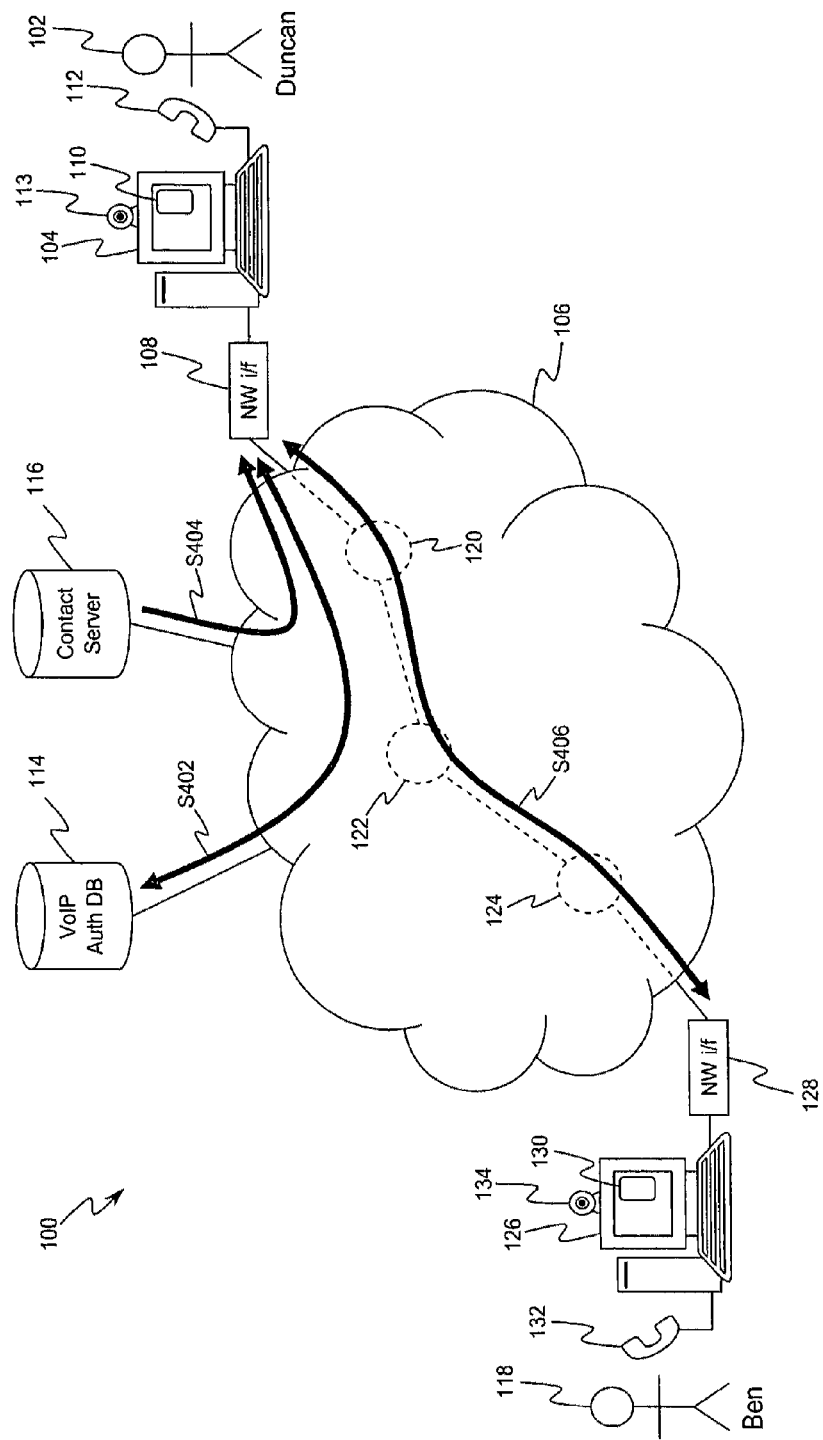
FIG. 4 shows the process for a user to authenticate with the VoIP system and initiate a video call with another user.

Reference is now made to FIG. 4, which illustrates the process for Duncan 102 to authenticate with the VoIP system and initiate a video call with another user (for the purposes of this example called "Ben" 118) in the system illustrated in FIG. 1.

When Duncan 102 first registers with the VoIP system the client 110 is provided with a digital certificate from a VoIP authentication server 114, as illustrated in step S402. Subsequent to the initial registration with the VoIP system, the user must also provide a username (referred to hereinafter as a VoIP ID) and password in order to log-in to the VoIP system and view their contact list and make calls. This is performed by the user entering the username (VoIP ID) and password into the client 110, and the username and password are then authenticated with the VoIP authentication server 114. Alternatively, these authentication details may be stored by the client 110, so that the user does not need to manually enter them every time the client is executed, but the stored details are still passed to the VoIP authentication server 114 to be authenticated.

The contact list for the users (e.g. the contact list 208 for Duncan) is stored in a contact server 116 shown in FIG. 1. When the client 110 logs into the VoIP system the contact server is contacted (in step S404), and the contact list is downloaded to the user terminal 104. This allows the user to log into the VoIP system from any terminal and still access the same contact list. The client 110 also periodically communicates with the contact server 116 in order to obtain any changes to the information on the contacts in the contact list, or to update the stored contact list with any new contacts that have been added. Presence information is not stored centrally in the contact server. Rather, the client 110 periodically requests the presence information for each of the contacts in the contact list 208 directly over the VoIP system.

In step S406, a video call is made between Duncan 102 and Ben 118. Calls to the users in the contact list may be initiated over the VoIP system by selecting the contact listed in the client 110 and clicking on a "call" button 222 (as shown in FIG. 2) using a pointing device such as a mouse. Alternatively, the call may be initiated by typing in the VoIP identity of a contact in the field 224. Referring again to FIG. 4, in the illustrative example of a P2P VoIP system, the call set-up is performed using proprietary protocols, and the route over the Internet 106 between the calling user and called user is determined by the peer-to-peer system without the use of servers. In FIG. 4, an illustrative route is shown between the caller Duncan (102) and the called party, Ben (118), via other peers (120, 122, 124) of the system. It will be understood that this route is merely an example, and that the call may be routed via fewer or more peers.

Following authentication through the presentation of the digital certificates (to prove that the users are genuine subscribers of the VoIP system—described in more detail in WO 2005/009019), the video call can be made using the transmission of packets comprising video and voice data. The client 110 performs the encoding and decoding of video and voice data packets. Video and voice data packets from the user terminal 104 are transmitted into the Internet 106 via the network interface 108, and routed by the VoIP system to the computer terminal 126 of Ben 118, via a network interface 128. A client 130 (similar to the client 110) running on the user terminal 126 of Ben 118 decodes the packets to produce a video and an audio signal that can be displayed on the display device of user terminal 126 and heard by Ben 118 using the handset 132. Conversely, video images of Ben 118 are captured by camera 134 connected to user terminal 126, audio data is captured by handset 132, and the client 130 executed on user terminal 126 encodes the video and audio signals into packets and transmits them across the Internet 106 to the user terminal 104. The client 110 executed on user terminal 104 decodes the packets from Ben 114, and produces a video display and an audio signal that can be heard by the user of the handset 112.

The packets for the video call described above are passed across the Internet 106 only, and the public switched telephone network ("PSTN") is not involved. Furthermore, due to the P2P nature of the system illustrated in FIG. 4, the actual video calls between users of the VoIP system can be made with no servers being used. This has the advantages that the system scales easily and maintains a high quality, and the call can be made free to the users. It will be appreciated, however, that other (non-P2P) types of communication system could also be used.

Figure 5:
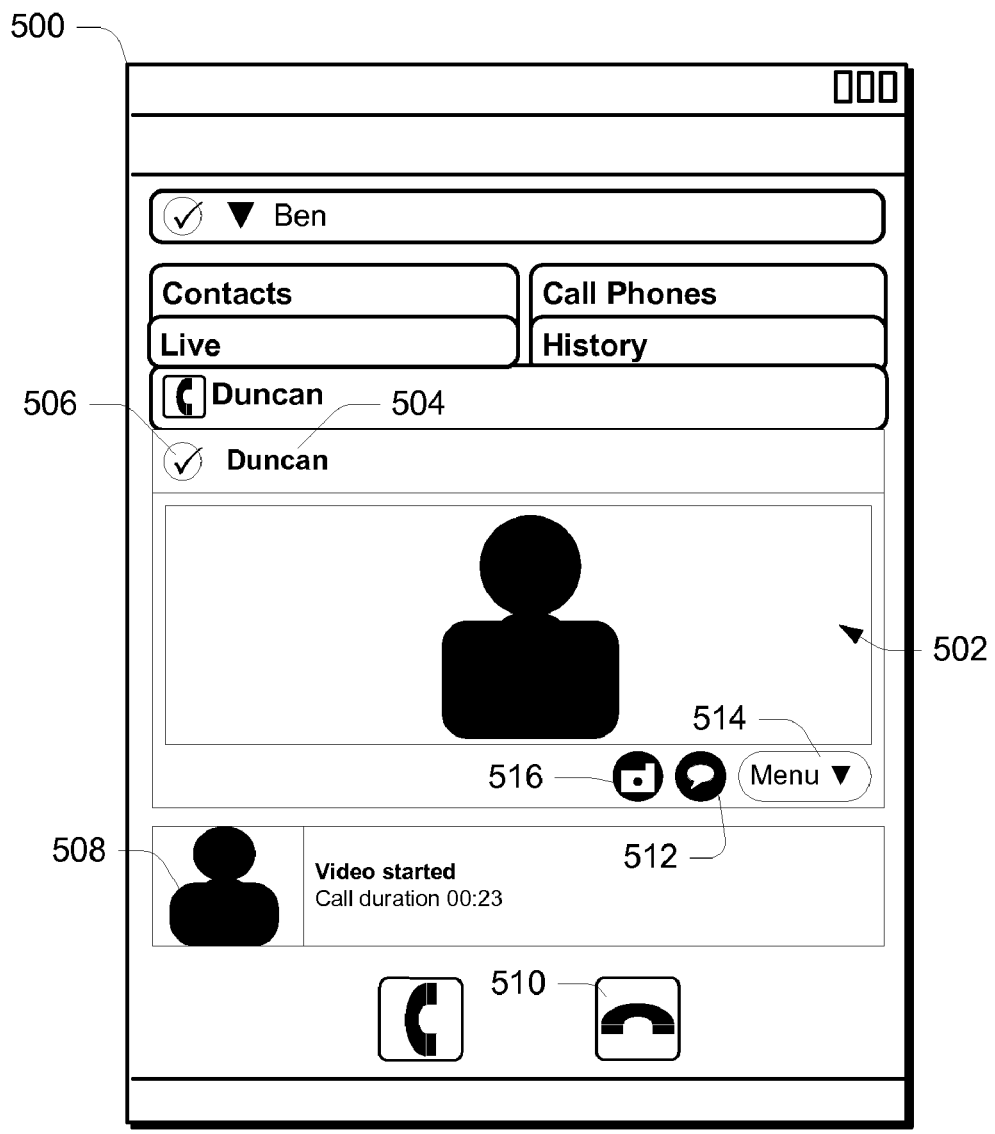
FIG. 5 shows a user interface of a client during a video call.

Reference is now made to FIG. 5, which illustrates a user interface 500 of the client 130 displayed on user terminal 126 to the user Ben 118 during a video call with the user Duncan 102. In the centre of the user interface 500 is a display of the video stream 502 from the user Duncan 102 (i.e. the images captured by camera 113 on user terminal 104 and transmitted over the network 106). The user interface 500 also shows the name 504 and presence state 506 of the user from whom the video stream is being received. Below the display of the video stream 502 is a smaller video display 508, which shows the video being captured by the camera 134 on user terminal 126. In other words, the small video display 508 shows the video stream that is being transmitted from Ben 118 to Duncan 102. The small video display 508 allows the user to view how he is seen by the remote party, thereby ensuring that his own image is correctly framed. Note that it is not necessary for video to be two-way. For example, a video stream may be received from Duncan 102 without a corresponding video being sent from Ben 118 (this can be the case if, for example, only one party has a webcam or simply if they choose not to send video). In this instance, the small video display 508 is not shown for the party that is not transmitting video.

The user Ben 118 can end the video call by selecting the call end button 510. A chat button 512 is present to initiate an IM conversation with the remote user. A drop-down menu with further controls is displayed by actuating menu button 514 (as will be described hereinafter).

At any point during the video call, the user Ben 118 can activate an image capture button 516. The activation of the image capture button 516 causes the client 130 to capture the current frame of the video stream 502.

The current frame of the video stream can be captured in different ways. In one embodiment, the client 130 can capture the video frame exactly as is displayed in the user interface 500 of the client 130. In other words, the activation of the image capture button 516 causes a "screen grab" or "screen shot" to be taken of the section of the user interface 500 that displays the video stream 502. In an alternative embodiment, the activation of the image capture button 516 causes a message to be transmitted from the client 130 to the client 110 running on the user terminal 104 of the remote user (Duncan 102). The message instructs the client 110 to capture the current frame of the video from its source—the webcam 113. Therefore, the client 110 captures the current frame that is being provided by the webcam 113 before it has been encoded and transmitted across the network 106. The client 110 then establishes a file transfer with client 130 over the network, and transfers the captured frame to the client 130. This method has the advantage that the image captured is of a higher quality and resolution than the "screen grab" method, as the image is taken directly from its source and has not been encoded for transmission or reduced in size. The file transfer can be performed without interaction from either of the users, so that conversation is not interrupted.

The current frame of the video stream 502 (captured in either of the two ways above) is converted to a predetermined image format and saved to the storage device (such as hard-disk drive 305 in FIG. 3). In a preferred embodiment, the image format used is the portable network graphics ("PNG") format. In alternative embodiments, the captured image could be converted and saved using an image format such as JPEG, TIFF, GIF, BMP or any other suitable image format.

When the client 130 is converting the frame of the video stream to the image format, the client 130 also embeds extra data into the image file, in addition to the image itself. Specifically, the client embeds the user ID of the source of the video stream. Therefore, in this example, when the user Ben 118 activates the image capture button 516, an image from the video stream 502 originating from Duncan 102 is captured, converted to an image format which has Duncan's user ID embedded within it, and saved to the storage device of Ben's user terminal 126.

In the preferred embodiment that saves the image in the PNG format, the user ID is stored in a text "chunk" of the PNG file. A "chunk" is a component of a PNG file that stores specific information. A text chunk can be used to store text information, and the user ID can be written as text information into this chunk. The user ID is written into the text chunk after a predetermined text label, allowing the client 130 to search for the known label, and hence extract the user ID. For example, the text label can be "SKYPENAME" and the user ID can be written in the text chunk immediately after this label. Other image formats have similar information containers that can be used to store the user ID.

The user ID embedded in the image file is a communication identifier, and can be utilised to manage the saved image and also initiate communication events, as will be described in more detail hereinafter. Preferably, further data is also embedded in the image file, such as the date and time at which the image was captured from the video stream.

Preferably, the image is saved immediately in a predetermined directory on the storage device, without prompting the user for input. In alternative embodiments, however, the client 130 can request that the user specifies the location to which the image is saved. Preferably, the client will also play a sound when the user selects the image capture button 516. For example, this sound may resemble the sound of a camera shutter or a "click".

Figure 6:
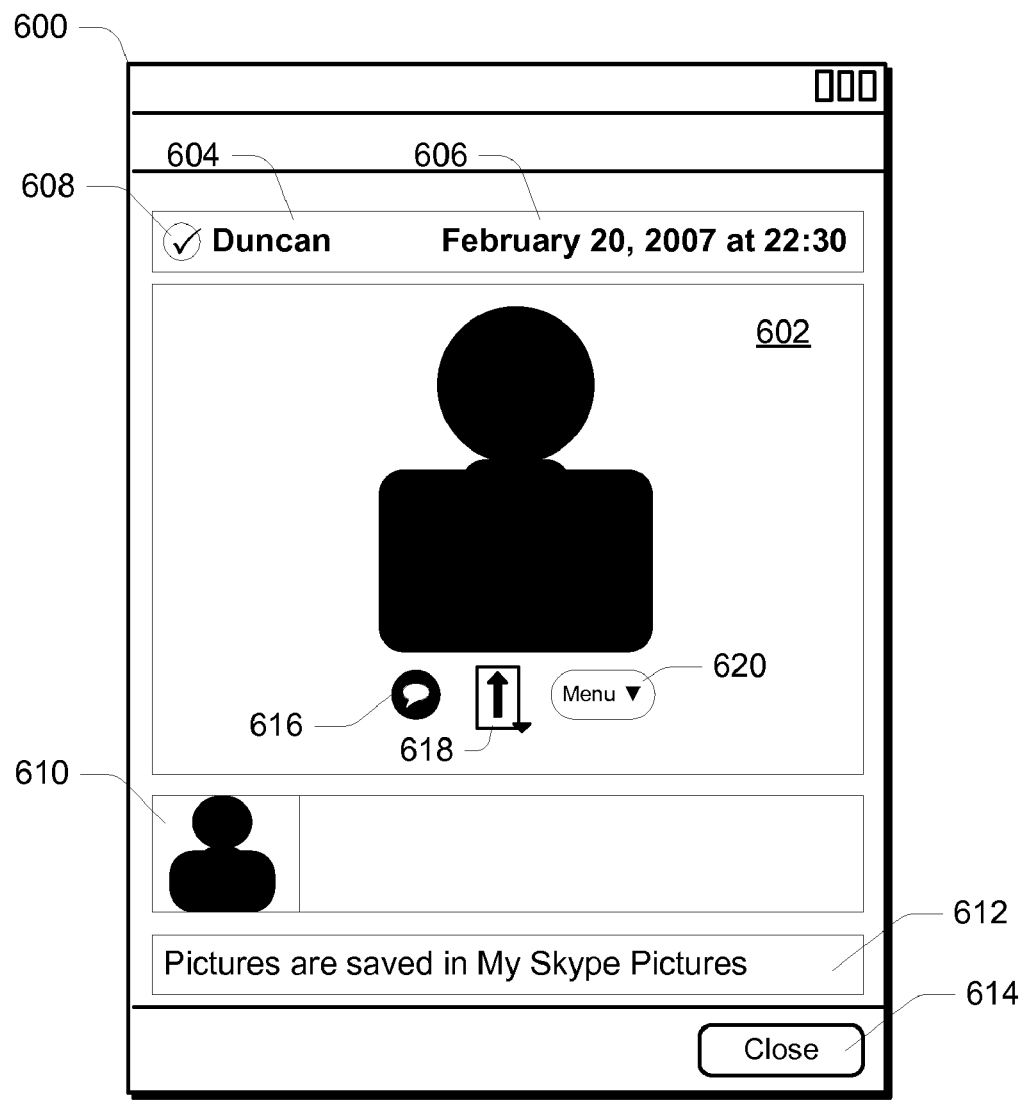
FIG. 6 shows an image viewer displayed during a video call with one stored image.

When the client 130 has converted the image and the embedded data to the required image format, and has stored the image, the client 130 initiates the opening of a pop-up image viewer 600, as shown in FIG. 6. The image viewer 600 loads the saved image and displays it in image pane 602. The image viewer 600 also reads the embedded data from the image, and displays the name 604 of the contact associated with the embedded user ID. The date and time that the image was taken is read from the embedded data and displayed at 606. The client can also use the embedded user ID to determine other information about the user associated with the user ID, such as his current presence state, as shown using icon 608.

Figure 7:
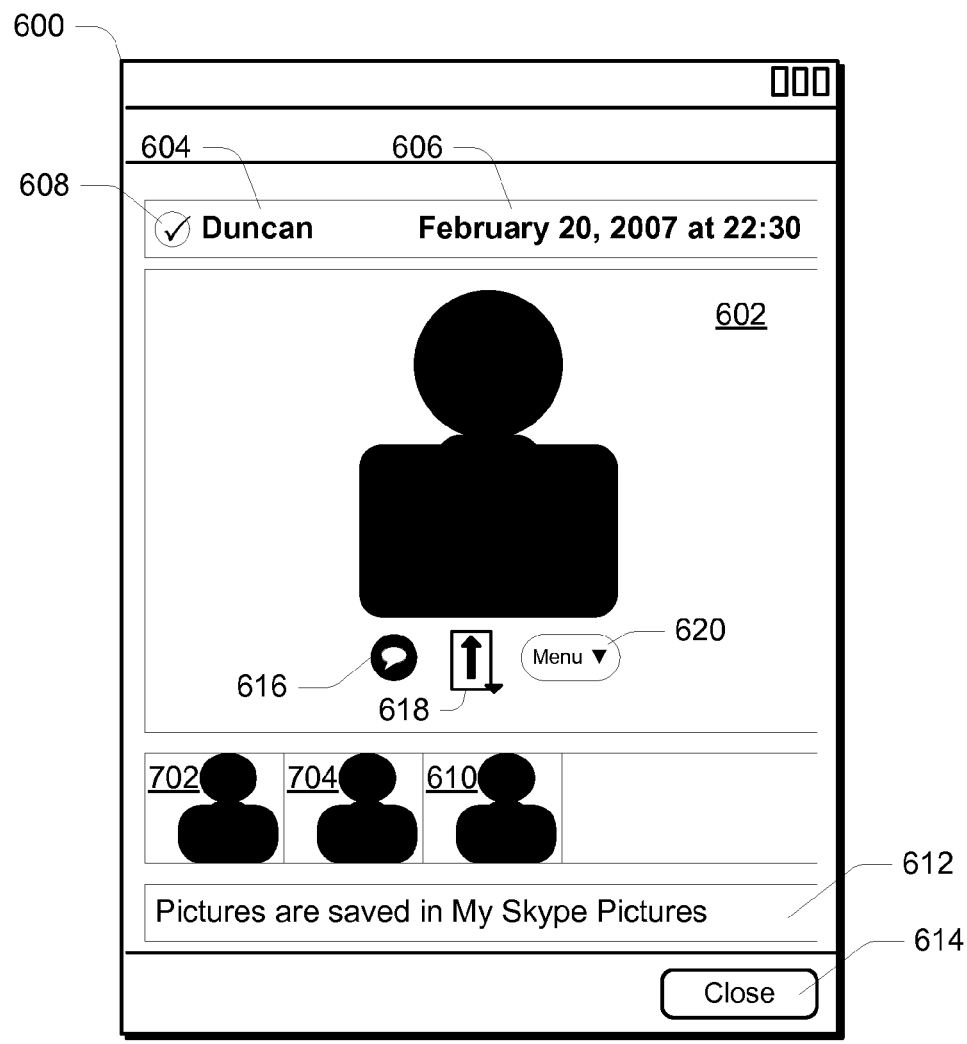
FIG. 7 shows an image viewer displayed during a video call with a plurality of stored images.

Below the image pane 602 is a thumbnail image region, which displays thumbnails of all the images that the user has captured from video streams and retained. In the case of FIG. 6, only one image has been captured, and hence thumbnail 610 is a small representation of the image shown in pane 602. FIG. 7 shows an example where more images (702, 704) have been captured, and the most recently captured image (610) is shown displayed at the end of the sequence of thumbnail images. Selecting a different thumbnail image causes the selected image to be displayed in the image pane 602.

Returning to FIG. 6, the directory in which the images are stored is indicated at 612, and the user can choose to close the image viewer 600 by actuating "close" button 614.

The image viewer overlays a set of controls over the image in pane 602. These controls are used to initiate communication events directly from the image viewer by utilising the embedded user ID in the image file. In FIG. 6, a chat button 616 is shown, which, when actuated by the user, causes the client 130 to initiate an IM conversation using the user ID from the image file. Therefore, in the case of the example shown in FIG. 6, when the user (Ben 118) selects the chat button 616, an IM chat session is initiated by client 130 with Duncan 102. A file transfer button 618 is also shown, which, when actuated, causes a file transfer of the displayed image to be initiated. This is described in more detail with reference to FIGS. 12 and 13, hereinafter. Furthermore, a menu button 620 is also displayed, which comprises further options, and is described in more detail with reference to FIG. 14.

It should be noted that in FIG. 6 there is not a button to initiate a voice or video call with the user whose user ID is embedded in the image. This is because the image viewer 600 shown in FIG. 6 has been launched immediately following the image being captured from the video stream (by activating button 516 in FIG. 5). Therefore, at this point there is still an ongoing video call between, for example, Ben 118 and Duncan 102, and hence it is not possible to initiate a further call whilst the current one is ongoing. However, once the current video call has ended, then this is possible, as will be described with reference to FIG. 10, below.

Figure 8:
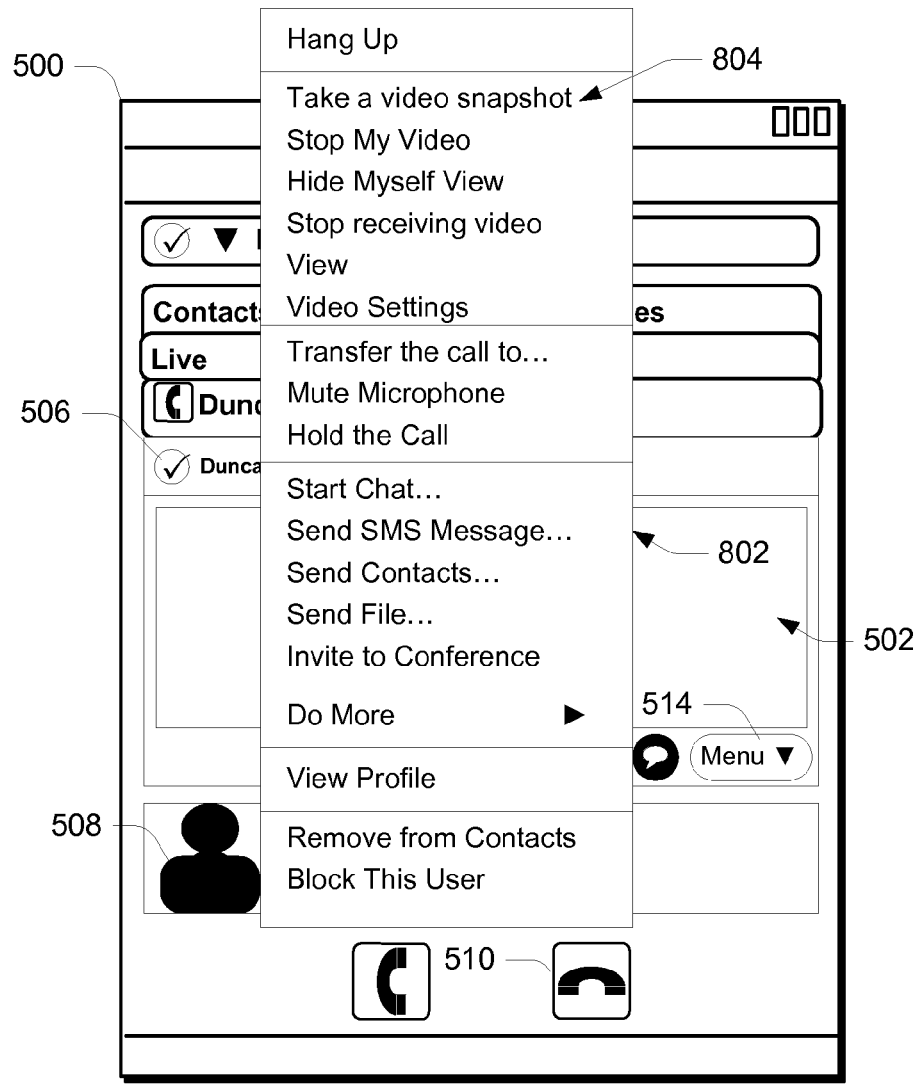
FIG. 8 shows a video image capture option in a pop-up menu.

Reference is now made to FIG. 8, which illustrates an alternative method for triggering the capture of an image from a video stream. FIG. 8 shows the user interface 500 of the client 130 during a video call, as in FIG. 5. However, in FIG. 8, the user has selected menu button 514, which causes pop-up menu 802 to be shown. One of the options in the pop-up menu 802 is entitled "Take a video snapshot" 804, and the selection of this option activates the image capture functionality in the same way as selecting button 516 (described above with reference to FIG. 5).

Figure 9:
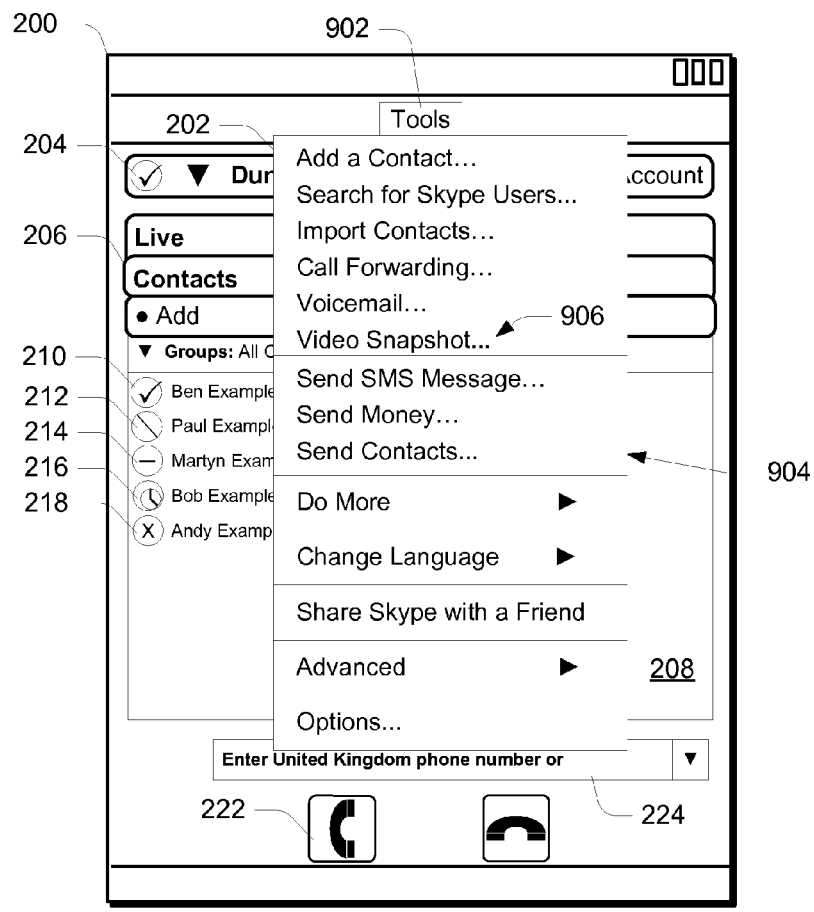
FIG. 9 shows a user interface of a client with a menu option to view subsequently captured images.

Reference is next made to FIG. 9, which illustrates the user interface 200 of the client 130 through which images captured during a video call can subsequently be viewed after the call has ended. The user interface 200 comprises the same features as described above with reference to FIG. 2. However, in FIG. 9, the user has selected the menu item labelled "tools" 902. The activation of the tools menu button displays the drop-down menu 904. The drop-down menu 904 comprises a plurality of options (most of which are beyond the scope of this description) including an option labelled "video snapshot . . . " 906.

Selection of the "video snapshot . . . " option 906 by the user results in the display of the pop-up image viewer 1000 shown in FIG. 10. The pop-up image viewer 1000 shown in FIG. 10 is similar to the image viewer 600 shown immediately after an image is captured (as shown in FIG. 6 and described hereinbefore).

Figure 10:
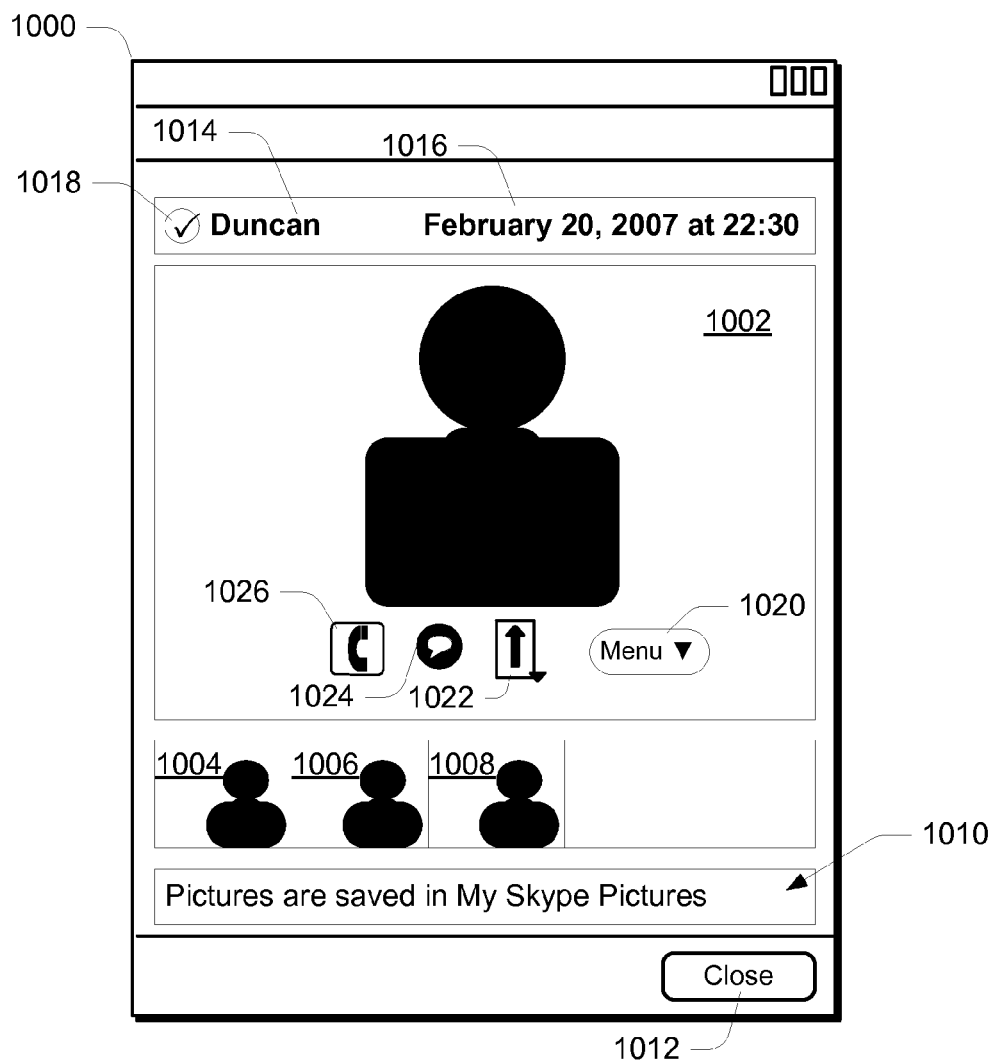
FIG. 10 shows an image viewer displayed subsequent to a video call.

In common with the pop-up image viewer 600 of FIG. 6, the image viewer 1000 of FIG. 10 comprises an image pane 1002, thumbnails (1004, 1006, 1008) of the images that have previously been captured by the user, a display of the directory 1010 in which the images are stored, and a "close" button 1012 that closes the pop-up image viewer 1000.

When one of the thumbnail images (e.g. 1008) is selected by the user the image viewer 1000 reads the embedded data from the image, and displays the image in the image pane 1002. In particular, the image viewer reads the embedded user ID contained within the image file. This is used to display the name 1014 of the contact associated with the embedded user ID. The date and time that the image was taken is read from the embedded data and displayed at 1016. The client can also use the embedded user ID to determine other information about the user associated with the user ID, such as his current presence state, as shown using icon 1018.

The main difference between the image viewer 600 and the image viewer 1000 is in the controls overlaid over the image being displayed, which can be used to initiate communication events directly from the image viewer. In the image viewer 1000 in FIG. 10, controls are displayed to display a drop-down menu 1020 (described with reference to FIG. 14, below), initiate a file transfer 1022 (described with reference to FIG. 12, below), and initiate an IM conversation 1024 using the embedded user ID. These controls were also present in image viewer 600. However, the image viewer 1000 additionally has a control to initiate a call 1026. The user can select button 1026 to initiate a call with the user whose user ID is embedded in the image file being displayed. More specifically, the client 130 uses the embedded user ID to set up a call over the network 106 with the client 110 that is logged in using the embedded user ID. The call established to the user with the embedded user ID may be either a voice call or a video call.

Figure 11:
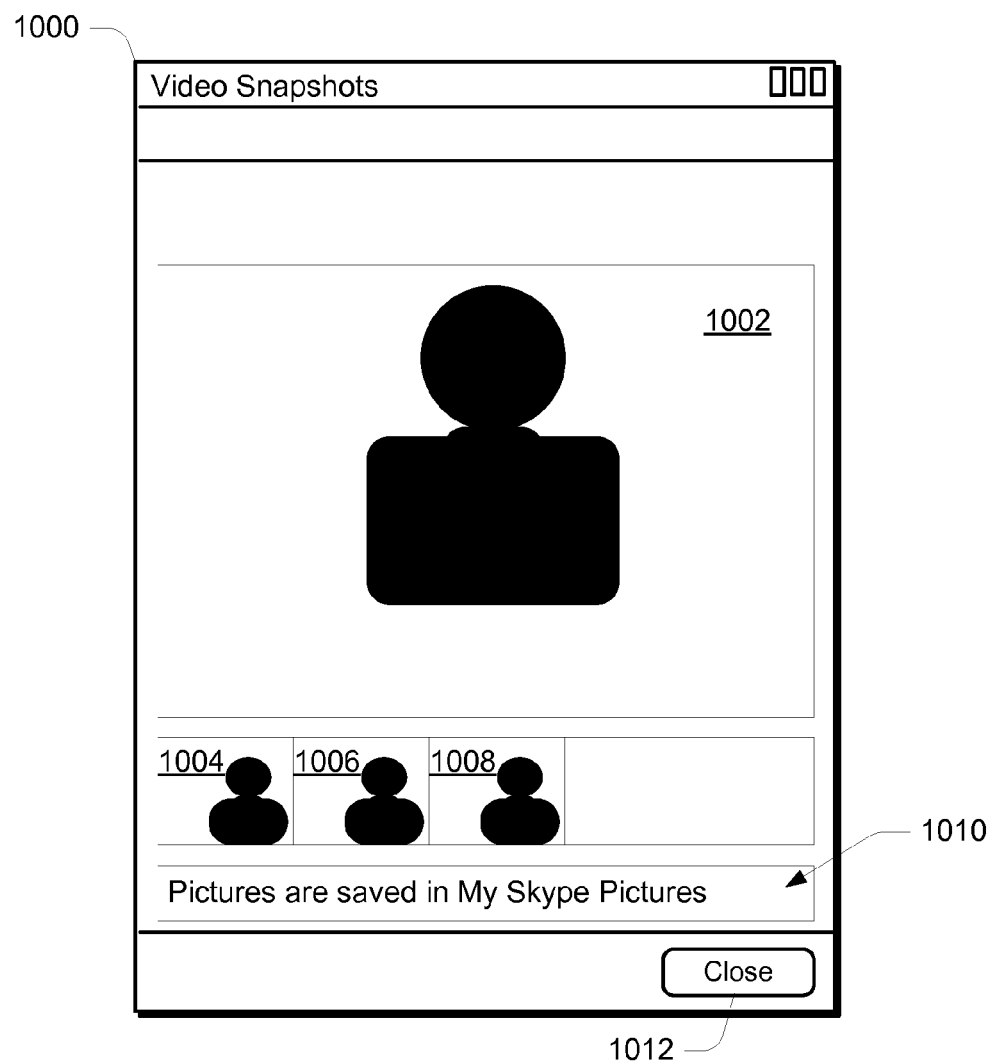
FIG. 11 shows an image viewer displayed subsequent to a video call with hidden controls.

If the cursor of the pointing device is moved out of the image pane 1002, or if the cursor is motionless for a predetermined period of time, then the controls (1020, 1022, 1024, 1026) and the bar showing the name 1014, time and date 1016, and presence state 1018 are removed from the image, as illustrated in FIG. 11. This allows the user an unencumbered view of the image that has been captured.

Figure 12:
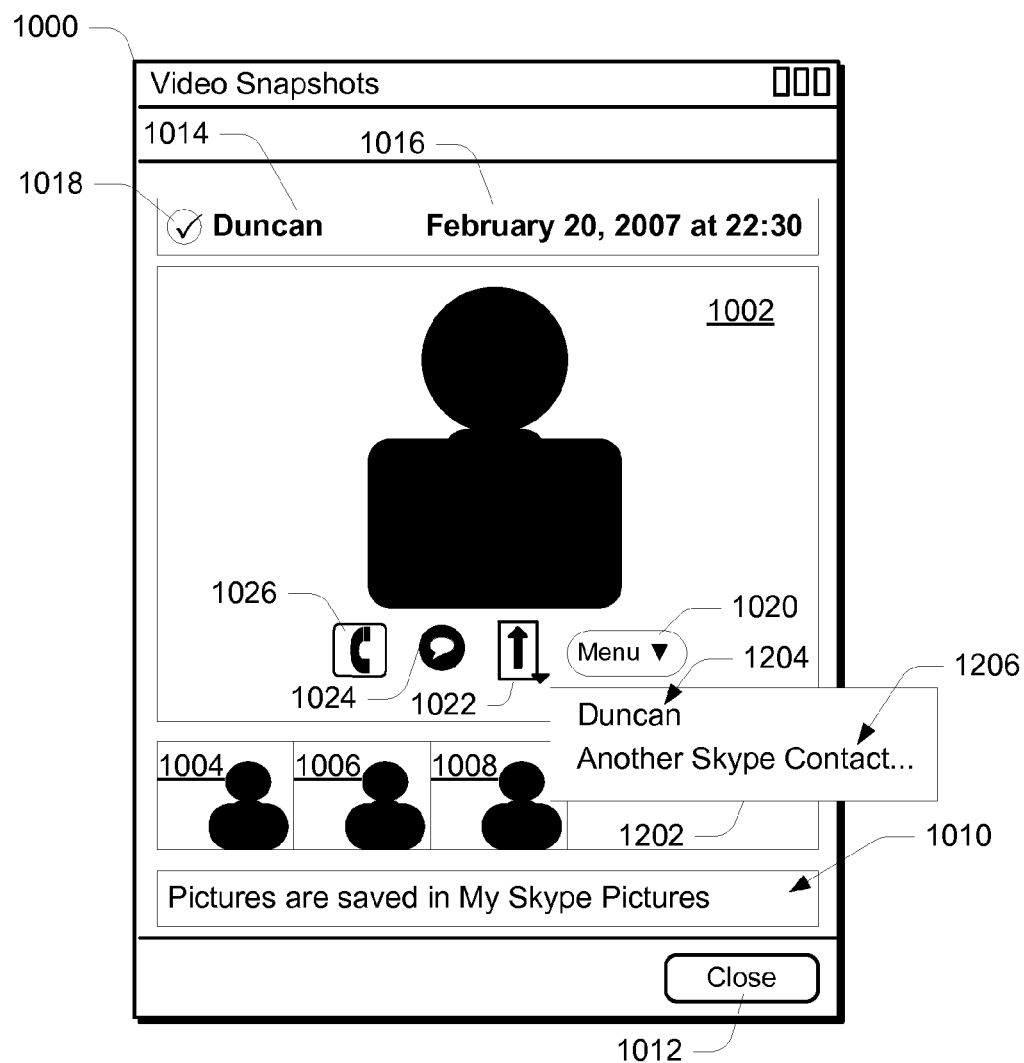
FIG. 12 shows the process by which a file transfer of an image file may be initiated from the image viewer.

FIG. 12 illustrates the process by which a file transfer of the image file may be initiated from the image viewer 1000. If the user selects the file transfer button 1022, then the drop-down menu 1202 is displayed. The drop-down menu 1202 comprises two options. The first option shows the name 1204 of the user whose user ID is embedded in the image file. If this option is selected, then the file transfer is established between the client 130 of Ben 118, and the client 110 of Duncan 102 (whose user ID is embedded in the image). When the file transfer is established, a copy of the image file comprising Duncan's user ID is transmitted over the network 106 and received by the client 110, and can subsequently be viewed and stored on the user terminal 104. Therefore, using this technique, an image captured from the video stream of a remote user can be sent back to the remote user very readily, using the information embedded in the image file itself, and by the simple selection of a single option in the image viewer displaying the image.

Figure 13:
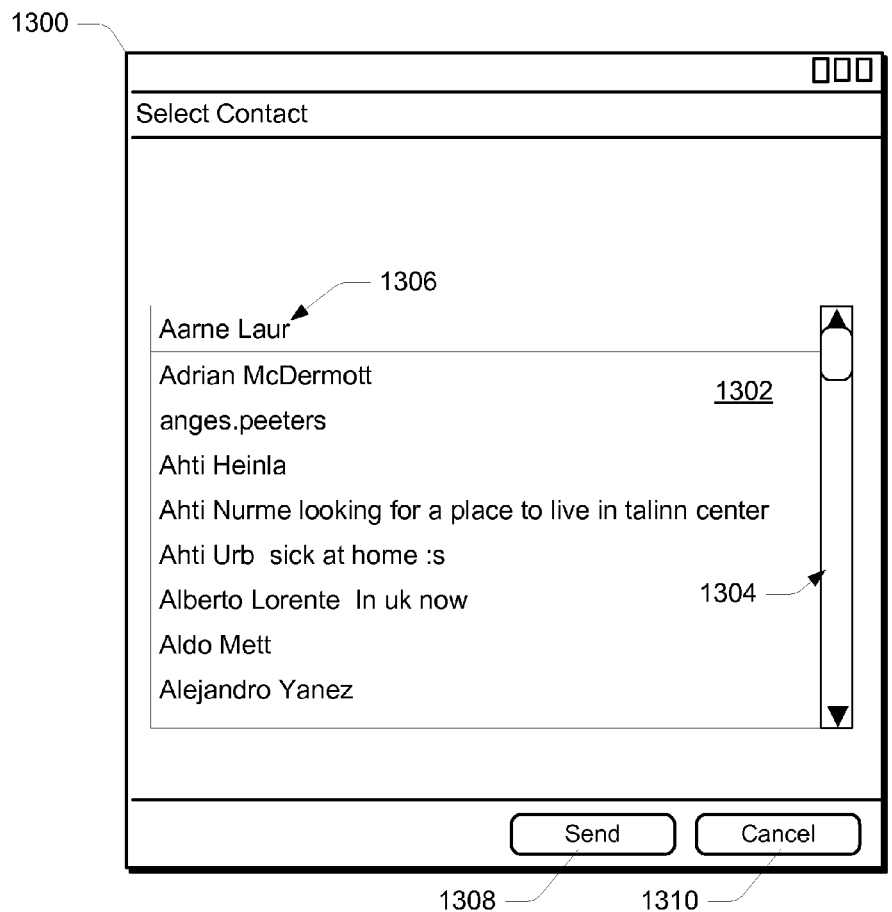
FIG. 13 shows a pop-up contact window for use in a file transfer.

The second option in menu 1202, indicated at 1206, allows the user to send the image file to another (third) user of the communication system. If this option is selected, then the pop-up contact window 1300 shown in FIG. 13 is displayed. The pop-up contact window 1300 displays the contact list 1302 of the user in order for the user to select a contact to which the image file should be sent. Scrollbars 1304 allow the user to scroll though the contacts if there are more than can be displayed within the pop-up window. The selected contact is highlighted, as shown at 1306. The user can send the file to the selected contact by activating the "send" button 1308, or cancel the process by selecting the "cancel" button 1310. When the send button 1308 is selected, the file transfer is established between client 130 and the client of the selected contact over the network 106, and the image file comprising the embedded data is transmitted to the selected contact.

Figure 14:
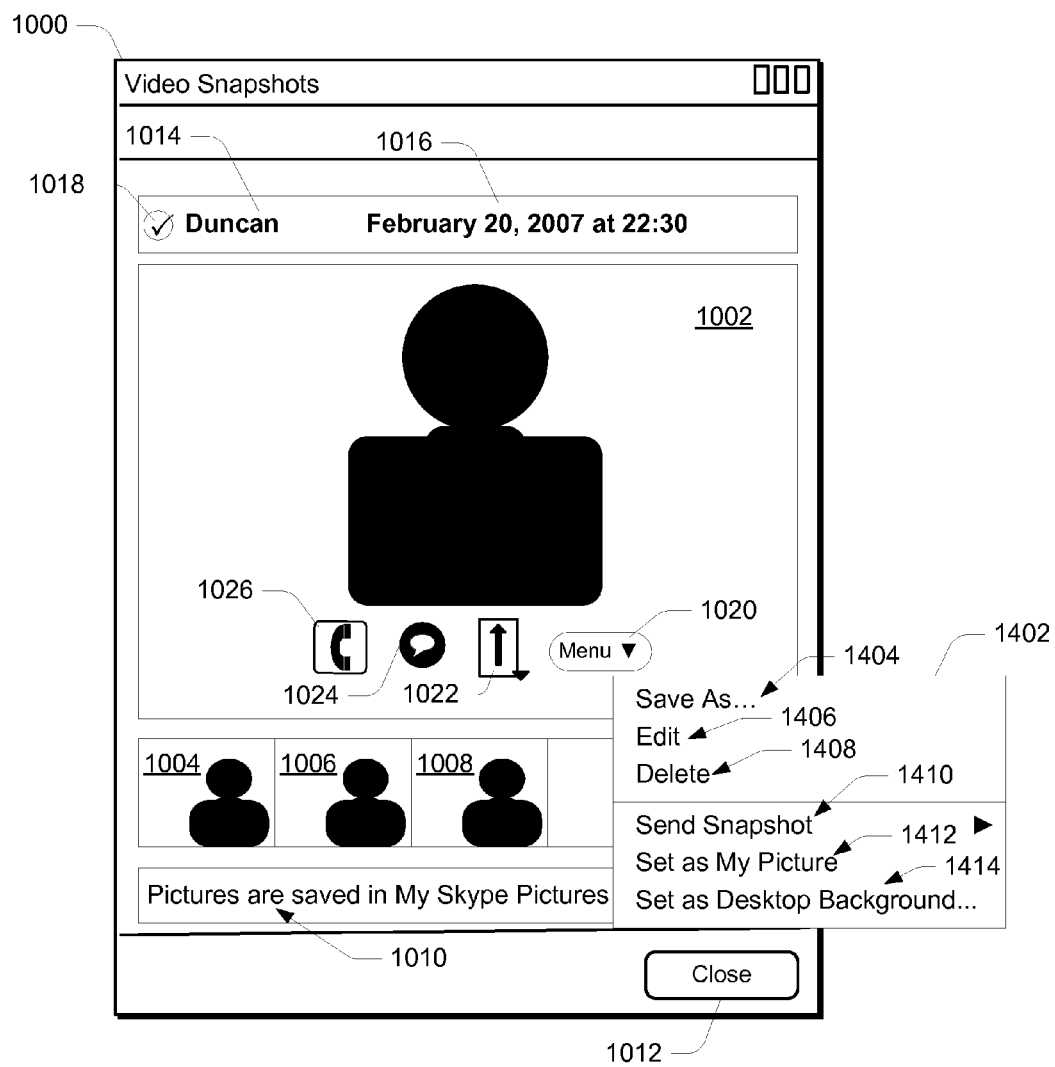
FIG. 14 shows a drop-down menu displayed in the image viewer.

Reference is now made to FIG. 14, which shows the drop-down menu 1402 displayed when the user activates the menu button 1020. The drop-down menu comprises several options that the user can use to manage the currently selected captured image. The user can save a copy of the current image to a given location on the storage device of the user terminal 126 by selecting the "save as . . . " option 1404. The user can open the currently selected image in an image editing application by selecting the "edit" option 1406. The user can delete the currently selected image from the storage device by selecting the "delete" option 1408.

The option labelled "send snapshot" 1410 in drop-down menu 1402 provides the same functionality as the file transfer button 1022, described above with reference to FIG. 12. The "set as my picture" option 1412 allows the user to set the currently selected image as their avatar picture in the communication system. The "set as desktop background" option sets the currently selected image as the background image in the operating system of the user terminal 126.

In an alternative embodiment, the client 130 is arranged to capture not a single frame of the video, but a clip of the video. In other words, rather than capturing an image from the video stream, a copy of the video stream itself is captured. The length of the video clip captured can be determined by the user (e.g. Ben 118) by the length of time that the capture button 516 is activated for. For example, when Ben 118 wants to capture a clip of the incoming video stream, he selects the capture button 516, and holds it in an activated state for the duration of the clip that he wishes to capture. When he releases the button, the video is saved to the storage device. Alternatively, the client 130 can be arranged to capture a predetermined interval of the video stream with a single activation of the capture button 516.

The result of capturing a clip of the video stream is that a sequence of frames have been grabbed by the client. This sequence of frames is converted to a predetermined video format and saved to the storage device (such as hard-disk 305 in FIG. 3). Example video formats include (but are not limited to) AVI, MOV, WMV, 3GP and DivX formats. The client 130 also embeds the user ID of the source of the video stream in the video file, in a similar manner as described above with reference to image files.

The video file can then be viewed and utilised in a similar manner to the image files described hereinbefore. The pop-up image viewer described with reference to FIG. 6 comprises an embedded video player arranged to playback the video format used to save the video clip. The user can then view the video clip using the embedded video player. In common with the image embodiment described above, the video player overlays controls over the video to allow communication events such as a call, IM conversation or file transfer to be initiated to the user with the ID embedded in the video. Therefore, the overall operation of the system is the same as that described above for images, except that the pop-up viewer (600, 1000) can playback video clips, rather than only displaying images.

While this invention has been particularly shown and described with reference to preferred embodiments, it will be understood to those skilled in the art that various changes in form and detail may be made without departing from the scope of the invention as defined by the appendant claims.

What is claimed is:

1. A method of capturing an image from a video call between a first user and a remote user over a communication network, comprising:
   receiving video data from said remote user at a user terminal of the first user, said video data comprising a sequence of frames;
   capturing multiple frames of said video data as a video clip and responsive to an indication of a command from said first user;
   saving said video clip as a video file and embedding a communication identity of said remote user in said video file, wherein said communication identity is suitable for initiating a communication event with said remote user in response to a selection of the video clip during a playback of the video clip; and
   storing the video file on a storage means of said user terminal.

2. A method according to claim 1, wherein said communication identity is a username of the remote user.

3. A method according to claim 1, wherein said communication event is a voice call.

4. A method according to claim 1, wherein said communication event is a video call.

5. A method according to claim 1, wherein said communication event is a file transfer.

6. A method according to claim 5, wherein said file transfer is a transfer of said video file.

7. A method according to claim 1, wherein said communication event is an instant messaging conversation.

8. A method according to claim 1, wherein said command from said first user comprises an actuation by said first user of a control displayed in a user interface of said user terminal.

9. A method according to claim 1, wherein said video file is a compressed video file.

10. A method according to claim 1, further comprising displaying said video clip to said first user in a user interface of said user terminal.

11. A method according to claim 1, wherein capturing said multiple frames occurs while the video call is in progress.

12. A method according to claim 1, wherein said indication of the command comprises an indication of a selection of a visual control that overlays at least a portion of a region in which the video data is displayed at the user terminal while the video call is in progress.

13. A method according to claim 1, further comprising embedding the date and time of the image capture in said video file.

14. A method according to claim 1, wherein storing the video file comprises storing the video file in a predetermined directory on said storage means of said user terminal.

15. A method according to claim 1, further comprising playing a sound responsive to capturing the multiple frames of said video data.

16. A method according to claim 1, wherein the user terminal of the first user is a personal computer.

17. A method according to claim 1, wherein the user terminal of the first user is a mobile device.

18. A storage device storing a computer program product comprising program code which, when executed by a computing device, implements steps according to the method of claim 1.

19. A method of initiating a communication event between a first user terminal and a remote user terminal over a communication network, comprising:
   opening an image file stored at said first user terminal responsive to a command from a first user, said image file comprising image data and an embedded communication identity of a user of said remote user terminal;
   reading the communication identity from the image file and displaying an image from said image data;
   displaying at least one user-operable control in association with said image, said user-operable control including a visual indication of presence information for the user of said remote user terminal; and
   responsive to actuation of said at least one user-operable control by said first user, using said communication identity to initiate a communication event with said remote user terminal over said communication network.

20. A method according to claim 19, wherein said communication identity is a username of the user of the remote user terminal.

21. A method according to claim 19, wherein said communication event is a voice call.

22. A method according to claim 19, wherein said communication event is a video call.

23. A method according to claim 19, wherein said communication event is a file transfer.

24. A method according to claim 23, wherein said file transfer is a transfer of said image file.

25. A method according to claim 19, wherein said communication event is an instant messaging conversation.

26. A method according to claim 19, wherein the presence information indicates at least one of whether the user of the remote user terminal is online, not available, not to be disturbed, away, or offline.

27. A method according to claim 19, further comprising determining a name for said user of the remote user terminal using said communication identity, and displaying said name in association with said image.

28. A method according to claim 19, wherein said image file further comprises the date and time of the creation of said image file, and the method further comprises the step of reading the date and time and displaying the data and time in association with said image.

29. A method according to claim 19, wherein said image is stored on a storage means of said user terminal, and wherein said step of opening said image file comprises accessing a predetermined directory of said storage means.

30. A method according to claim 29, further comprising opening at least one other image file stored in said predetermined directory and displaying said at least one other image file as a thumbnail image.

31. A method according to claim 19, wherein said communication network is a voice over internet protocol communication network.

32. A method according to claim 31, wherein said voice over internet protocol communication network is a peer-to-peer communication network.

33. A method according to claim 19, wherein the first user terminal is a personal computer.

34. A method according to claim 19, wherein the first user terminal is a mobile device.

35. A storage device storing a computer program product comprising program code which when executed by a computing device, implements steps according to the method of claim 19.

36. A user terminal configured to capture an image from a video call between the user terminal and a remote user terminal over a communication network, comprising:
   processing means arranged to execute a client, wherein said client is configured to:
     receive video data comprising a sequence of frames;
     capture multiple frames of said video data as a video clip and responsive to a command from said first user,
     extract image data from said multiple frames, convert said image data to a video file, and embed a communication identity of a user associated with said remote user terminal in said video file, wherein said communication identity is suitable for initiating a communication event with said remote user terminal in response to a selection of the video clip during a playback of the video clip; and
   storage means for storing the video file on said user terminal.

37. A user terminal according to claim 36, wherein said communication identity is a username of the user associated with the remote user terminal.

38. A user terminal according to claim 36, wherein said communication event is a voice call.

39. A user terminal according to claim 36, wherein said communication event is a video call.

40. A user terminal according to claim 36, wherein said communication event is a file transfer.

41. A user terminal according to claim 40, wherein said file transfer is a transfer of said video file.

42. A user terminal according to claim 36, wherein said communication event is an instant messaging conversation.

43. A user terminal according to claim 36, wherein said command from said first user comprises the actuation by said first user of a control displayed in a user interface of said client.

44. A user terminal according to claim 36, wherein said video file is a compressed video file.

45. A user terminal according to claim 36, further comprising display means for displaying said video data in a user interface of said client.

46. A user terminal according to claim 45, wherein said client is arranged to capture said multiple frames of said video data while the video call is in progress.

47. A user terminal according to claim 36, wherein said client is arranged to capture said multiple frames of said video data responsive to an indication of a selection of a visual control that overlays at least a portion of a region in which the video data is displayed at the user terminal while the video call is in progress.

48. A user terminal according to claim 36, wherein said client is further arranged to embed the date and time of the capture of the multiple frames in said video file.

49. A user terminal according to claim 36, wherein said client is further arranged to store the video file in a predetermined directory on said storage means of said user terminal.

50. A user terminal according to claim 36, wherein said client is further arranged to play a sound responsive to capturing the multiple frames of said video data.

51. A user terminal according to claim 36, wherein the user terminal is a personal computer.

52. A user terminal according to claim 36, wherein the user terminal is a mobile device.

53. A user terminal for initiating a communication event with a remote user terminal over a communication network, comprising:
  display means;
  storage means; and
  processing means arranged to execute a client, wherein said client is configured to be executed by said processing means to:
    open an image file stored on said storage means responsive to a command from a first user of the user terminal, said image file comprising image data and an embedded communication identity of a remote user associated with the remote user terminal;
    read the communication identity from the image file;
    display an image from said image data on said display means; and
    display at least one user-operable control in association with said image on said display means, said user-operable control including a visual indication of presence information for the remote user; and
    responsive to actuation of said at least one user-operable control, use said communication identity to initiate a communication event with said remote user terminal over said communication network.

54. A user terminal according to claim 53, wherein said communication identity is a username of the remote user.

55. A user terminal according to claim 53, wherein said communication event is a voice call.

56. A user terminal according to claim 53, wherein said communication event is a video call.

57. A user terminal according to claim 53, wherein said communication event is a file transfer.

58. A user terminal according to claim 57, wherein said file transfer is a transfer of said image file.

59. A user terminal according to claim 53, wherein said communication event is an instant messaging conversation.

60. A user terminal according to claim 53, wherein the presence information indicates at least one of whether the remote user is online, not available, not to be disturbed, away, or offline.

61. A user terminal according to claim 53, wherein said client is further arranged to determine a name for said remote user using said communication identity, and display said name in association with said image.

62. A user terminal according to claim 53, wherein said image file further comprises the date and time of the creation of said image file, and wherein said client is further arranged to read the date and time and display the data and time in association with said image.

63. A user terminal according to claim 53, wherein said client is further arranged to open said image file from a predetermined directory of said storage means.

64. A user terminal according to claim 63, wherein said client is further arranged to open at least one other image file stored in said predetermined directory and display said at least one other image file as a thumbnail image.

65. A user terminal according to claim 53, wherein said communication network is a voice over internet protocol communication network.

66. A user terminal according to claim 65, wherein said voice over internet protocol communication network is a peer-to-peer communication network.

67. A user terminal according to claim 53, wherein the user terminal is a personal computer.

68. A user terminal according to claim 53, wherein the user terminal is a mobile device.

69. A method of capturing a video clip from a video call between a first user terminal and a remote user terminal over a communication network, comprising:
  receiving video data from said remote user terminal at the first user terminal, said video data comprising a sequence of frames;
  capturing a plurality of said frames of said video data as a video clip responsive to a command from said first user;
  converting said plurality of said frames to a video file and embedding a communication identity of said remote user in said video file, wherein said communication identity is suitable for initiating a communication event with said remote user terminal in response to a selection of a visual region in which the video clip is displayed during playback of the video clip; and
  storing the video file on a storage means of said first user terminal.

70. A method of initiating a communication event between a first user terminal and a remote user terminal over a communication network, comprising:
  opening a video file stored at said first user terminal responsive to a user command, said video file comprising video data and an embedded communication identity of a remote user associated with said remote user terminal;
  reading the communication identity from the video file and displaying a video from said video data;
  displaying at least one user-operable control in association with said video, said user-operable control including a visual indication of presence information for the remote user; and
  responsive to actuation of said at least one user-operable control using said communication identity to initiate a communication event with said remote user terminal over said communication network.

* * * * *